UNITED STATES PATENT OFFICE.

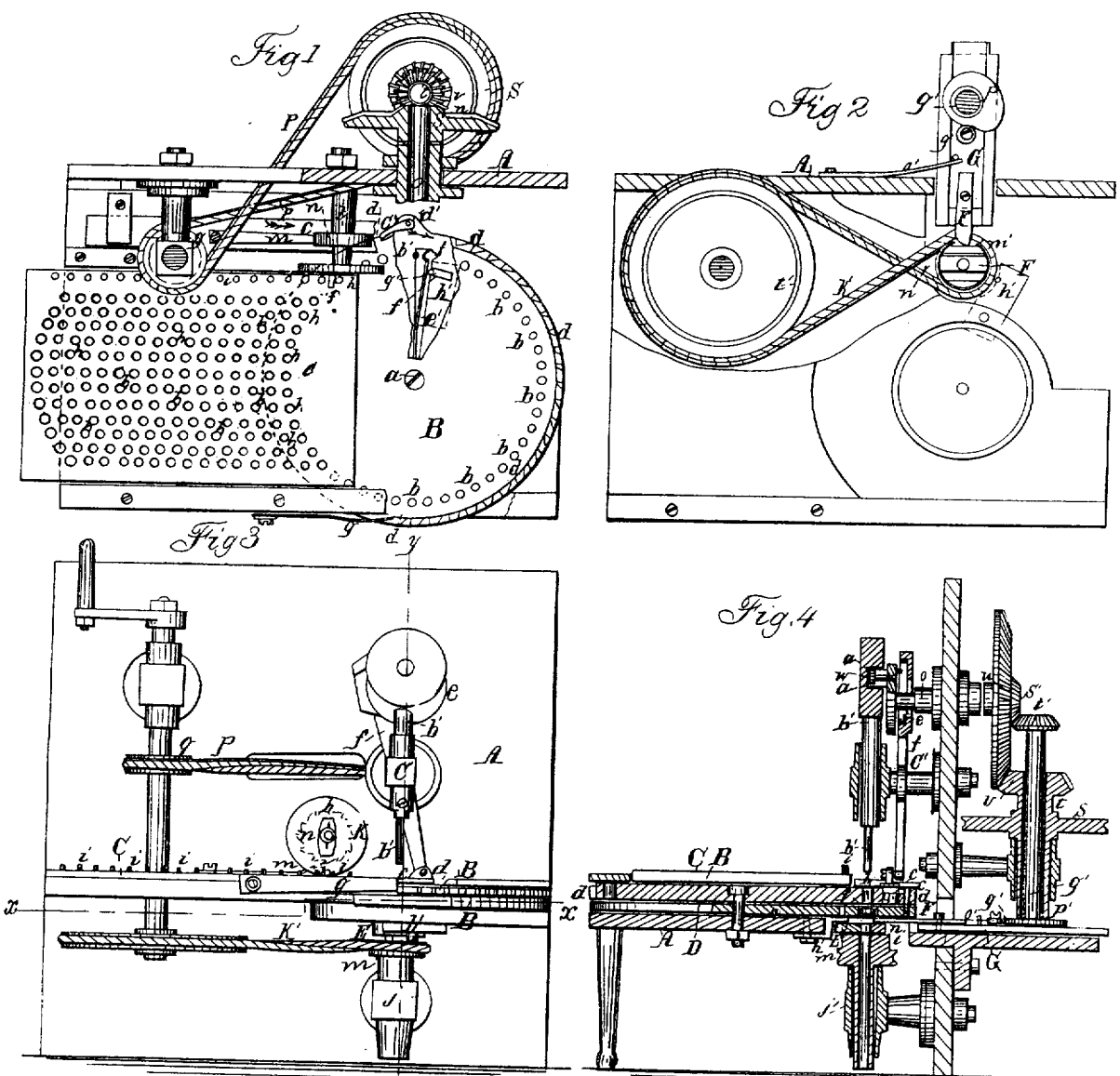

JAMES H. FOWLER AND A. J. FRENCH, OF WATERBURY, CONNECTICUT, ASSIGNORS TO THE AMERICAN FLASK AND CAP COMPANY.

IMPROVEMENT IN MACHINES FOR TRIMMING PERCUSSION-CAPS.

Specification forming part of Letters Patent No. 56,492, dated July 17, 1866.

*To all whom it may concern:*

Be it known that we, JAMES H. FOWLER and A. J. FRENCH, of Waterbury, in the county of New Haven and State of Connecticut, have invented a new and Improved Machine for Milling Percussion-Caps; and we do hereby declare that the following is a full, clear, and exact description thereof, which will enable others skilled in the art to make and use the same, reference being had to the accompanying drawings, forming part of this specification, in which—

Figure 1 represents a sectional plan or top view of this invention. Fig. 2 is a horizontal section of the same, taken in the plane indicated by the line $x\ x$, Fig. 3. Fig. 3 is a front elevation of the same. Fig. 4 is a transverse vertical section of the same, the plane of section being indicated by the line $y\ y$, Fig. 3.

Similar letters of reference indicate like parts.

This invention consists in a feed-plate provided with a series of feed-holes which are arranged in curved lines to correspond to the curve of the revolving conveyer, in such a manner that by means of said feed-plate a number of percussion-caps can be fed simultaneously into the holes of the revolving conveyer without stopping the motion of the machine.

It consists, further, in the arrangement of a revolving conveyer, in combination with the trimming-dies and tool, in such a manner that by said conveyer one cap after the other is brought over the trimming-dies, which take hold of the same and expose it to the action of the tool or knife.

It consists, also, in the arrangement of a spring, in combination with the revolving conveyer and trimming-dies, in such a manner that by said spring the caps are held in the proper position to enable them to enter the trimming-dies.

It consists, further, in the arrangement of a plunger, in combination with the conveyer and trimming-dies, in such a manner that by the action of said plunger the caps are forced down into the trimming-dies at the proper intervals.

It consists, also, in the arrangement of a pair of trimming-dies to which a rapid revolving motion is imparted, and which operate, in combination with a reciprocating knife, against the edge of the cap to be trimmed, so that the operation of trimming is effected with ease and rapidity.

It consists, finally, in giving to the cutting-edge of the trimming-knife an upwardly-inclined position, in such a manner that said cutting-edge begins to take effect on the highest part of the edge of the cap, and to cut the same down gradually until it is even and smooth all round.

A represents a frame, of cast-iron or any other suitable material of suitable strength and shape to support the working parts of our machine. On the frame is placed the conveyer B, which is composed of a flat disk which revolves on a vertical pivot, $a$, secured in the frame A. Said conveyer is provided with a series of holes, $b$, near its circumference, which serve to receive the caps to be trimmed, and an intermittent revolving motion is imparted to it by a slide, $c$, and a dog, $c^*$, which gears into ratchet-teeth $d$, cut into the periphery of the conveying-disk. The slide $c$ moves in suitable guides on the platform of the frame A, and the requisite reciprocating motion is imparted to it by the action of a cam, $e$, on an oscillating lever, $f$. A suitable stop-pawl, $g$, prevents the backward motion of the conveyer.

The holes in the conveyer are filled with caps by means of a feed-plate, C, which is provided with a series of holes, $h$, arranged in curved lines, to correspond to the curve on which the holes $b$ are situated. Said feed-plate moves between suitable guides on the upper surface of the frame A, and it is provided with pins or teeth $i$, which rise from its upper surface, and which are acted upon by a pin or tooth, $j$, projecting from a disk, $k$, which revolves freely on a stud, $l$, secured in the upright part of the frame A. An intermittent revolving motion is imparted to said disk by the action of a pawl, $m$, which is secured to the upper surface of the sliding dog $c$, and which gears in a ratchet-wheel, $n$, connected to the disk $r$ by a hollow shaft, or in any other suitable manner. The number of teeth of this ratchet-wheel is equal to the number of holes in each row of the feed-plate, and the distance of the pins or teeth $i$ in the feed-plate is equal to that between said rows of holes in the feed-plate, so that for each revolution of the disk k the feed-plate is caused to move the proper distance to bring a fresh row of holes of the feed-plates over the holes in the conveyer. The caps contained in the holes of the feed-plate are thus allowed to drop down automatically into the holes in the conveyer, and by providing a number of feed-plates the conveyer can be kept continually charged with caps without ever stopping the motion of the machine.

The cam e, which produces the oscillating motion of the lever f, is mounted on a shaft, o, to which a revolving motion is imparted by means of a belt, p, which extends from a pulley, q, on the driving-shaft round a pulley, s, on a hollow shaft, t, which connects, by a bevel-gear, u r, with the shaft o.

From the outside or face of the cam e projects an eccentric wrist-pin, w, which carries a slide, a', that fits into a slot in the head of the plunger b'. This plunger moves up and down in a tubular socket formed at the end of an arm, c', which also forms the fulcrum for the lever f, and its motion is so timed that on its downward stroke it passes through one of the holes of the conveyer. The conveyer B is supported by a flat plate, D, which connects by a pivot, d', with the slide c, and which oscillates on the center-pin a of the conveyer. If the slide c moves in the direction of the arrow marked on it in said figure, and the dog c* is caused to take a fresh tooth of the conveyer, said conveyer will be prevented from turning in that direction by the stop-pawl g; but when the slide c moves in the direction opposite the arrow marked on it in Fig. 1 the plate D and conveyer move together for the distance of one tooth of said conveyer. By this combined motion of the plate and conveyer the holes b in the conveyer are brought successively over a segmental aperture, e', in the plate D, and the cap in each hole is permitted to drop down into each segmental aperture, where it is retained by a spring, f'. The outer end of this spring is rounded to conform to the shape of the caps, and it closes up tight against a semicircular recess, f*, in the edge of the segmental aperture e'. If the plate D is turned in the direction of the arrow marked on it in Fig. 1 the spring f' (which is secured to it) strikes a pin, g', which rises from a stationary bracket, h', that is firmly attached to the frame A below the plate D. By the action of said pin the spring is thrown open, so as to admit the cap from one of the holes p in the conveyer, and the cap thus admitted lodges in the semicircular recess f*, the bracket h' preventing it from falling clear down. If the plate D moves back in the direction opposite the arrow marked on it the spring f' closes up and clamps the cap before the same is swept off of the bracket h', and retains it until the plunger b' descends and forces the same into the trimming-dies E.

These trimming-dies are secured to the top end of a vertical arbor, i', which has its bearing in an arm, j', extending from the frame A. A rapid rotary motion is imparted to said arbor by a belt, k', which extends from a large pulley, l', on the driving-shaft over a small pulley, m', on said arbor i', as shown particularly in Fig. 3. A spring, n', embraces the trimming-dies and closes them up, so that they will clamp the caps forced in between them by the action of the plunger b'.

Each cap while being clamped between the trimming-dies is acted upon by the trimming knife F, which is secured to a reciprocating carriage or rest, G, and which moves gradually up toward the center of the arbor i' and of the trimming-dies.

The motion of the carriage G is produced by the combined action of a spring, o', and cam p', said spring being used to keep a roller-stud, q', which rises from the carriage, in close contact with the working-face of the cam. This cam may, however, be so arranged that it imparts to the carriage a positive motion in either direction, and in that case the spring o' can be dispensed with.

The cam p' is mounted on the lower end of the shaft q', which passes through the hollow shaft t, and to which a slow revolving motion is imparted by a bevel-gear, s' t', the bevel-gear s' being mounted on the horizontal shaft o, or connected to the bevel-wheel u, which has been previously described. By this slow motion imparted to the cam p' the knife F is made to advance quite slowly against the rapidly-revolving cap in the trimming-dies, and the edge thereof is cut down until it is level.

The cutting-edge of the knife is inclined upward, so that its points begin to take action on the highest part of the edge of the cap, and said edge is gradually cut down, producing a smooth and well-finished article. Each cap, after having been trimmed, drops down through the hollow arbor i', being pushed out of the trimming-dies by the next succeeding cap.

By this machine a very large quantity of percussion-caps can be trimmed or milled in a very short time, and with comparatively little trouble or loss of time.

What we claim as new, and desire to secure by Letters Patent, is—

1. The feed-plate C, (one or more,) provided with a series of feed-holes, h, which are arranged in curved lines to correspond to the position of the holes b in the conveyer B, and operating, in combination with said conveyer, substantially as and for the purpose described.

2. The revolving conveyer B, in combination with the plunger b', trimming-dies E, and knife F, constructed and operating substantially as and for the purpose set forth.

3. The supporting-plate D and spring f', in combination with the conveyer B, constructed and operating substantially as and for the purpose described.

4. The stationary bracket h' and pin g', in combination with the spring $f'$, supporting-plate D, and conveyer B, constructed and operating substantially as and for the purpose set forth.

5. The reciprocating slide $c$ and dog $c^*$, in combination with the supporting-plate D and conveyer B, constructed and operating substantially as and for the purpose described.

6. The revolving trimming-dies E and clamping-spring $n^*$, in combination with the reciprocating knife F, constructed and operating substantially as and for the purpose set forth.

7. Giving to the cutting-edge of the trimming-knife an upwardly-inclined position, substantially as and for the purpose described.

JAMES H. FOWLER.
A. J. FRENCH.

Witnesses:
GILMORE C. HILL,
AMOS S. BLAKE.